United States Patent [19]

Hoff

[11] Patent Number: 5,016,273
[45] Date of Patent: May 14, 1991

[54] DUAL COMMUNICATION MODE VIDEO TAPE RECORDER

[75] Inventor: Don G. Hoff, Tiburon, Calif.

[73] Assignee: AT&E Corporation, San Francisco, Calif.

[21] Appl. No.: 295,172

[22] Filed: Jan. 9, 1989

[51] Int. Cl.$^5$ .............................................. H04N 7/167
[52] U.S. Cl. ................................. 380/10; 340/825.44; 358/335; 358/192.1; 358/194.1
[58] Field of Search ...................... 340/825.44; 380/10; 358/335, 192.1, 194.1

[56] References Cited

U.S. PATENT DOCUMENTS

| | | | |
|---|---|---|---|
| 4,337,480 | 6/1982 | Bourassin et al. | 358/194.1 |
| 4,418,364 | 11/1983 | Wine | 358/335 |
| 4,525,820 | 6/1985 | Enoki et al. | 358/335 |
| 4,746,919 | 5/1988 | Reitmeier | 358/194.1 |
| 4,879,611 | 11/1989 | Fukui et al. | 358/335 |

Primary Examiner—Thomas H. Tarcza
Assistant Examiner—David Cain

Attorney, Agent, or Firm—Elmer W. Galbi

[57] ABSTRACT

The present invention is a dual communication mode sysem that combines a point to point communications device with a television receiver and a video tape recorder. The result is a highly versatile and easily operated personal entertainment and communication center. The point to point communication device included in the personal communication and entertainment center can provide information to: (a) reset the center's time clock automatically if power to the center is interrupted or if the center clock must be synchronized to an accurate time (b) program the personal entertainment and communication center from a remote location; (c) provide authorization signals to allow the personal entertainment and communication center to descramble coded signals received by the television receiver from a source such as a satellite or cable hookup; and (d) provide personal messages which can be recorded on the video tape recorder and displayed on the television screen.

13 Claims, 7 Drawing Sheets

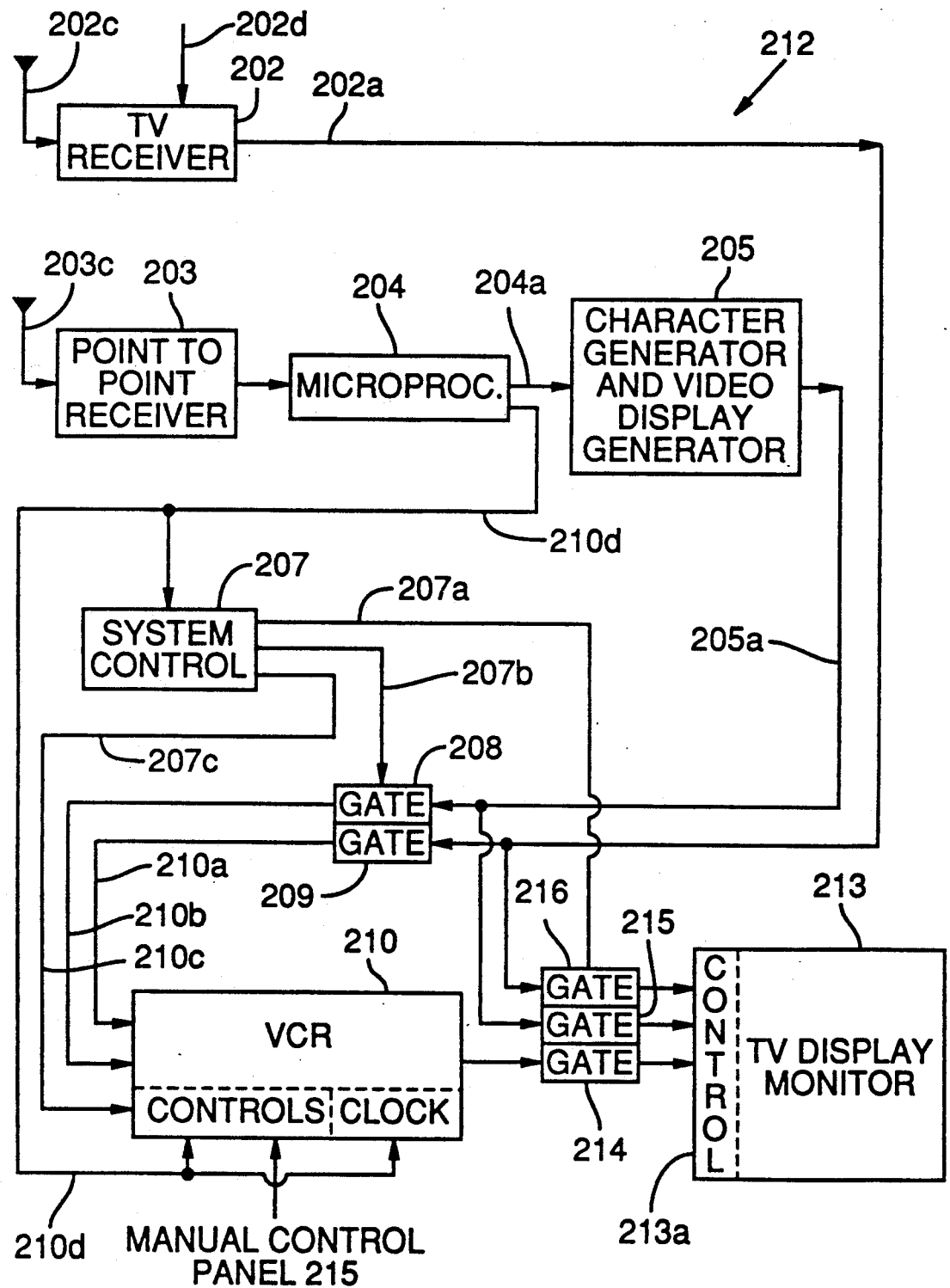

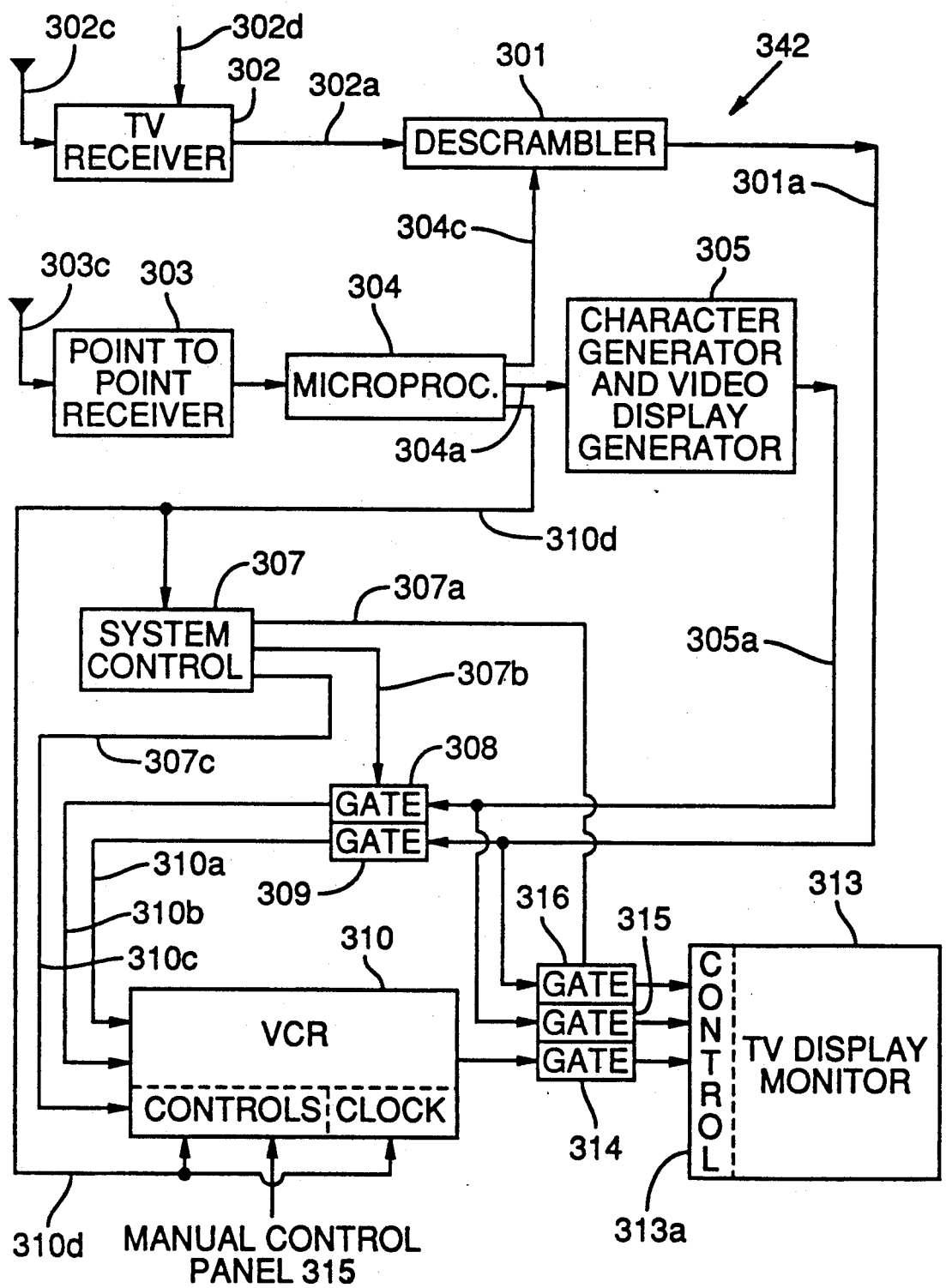

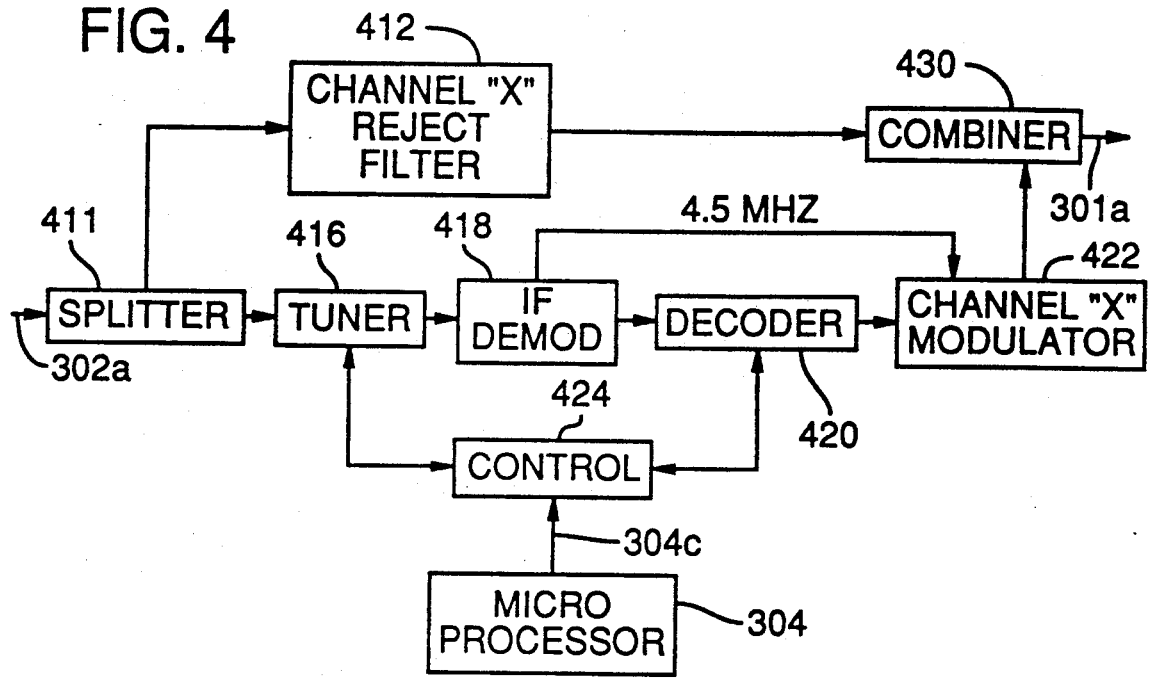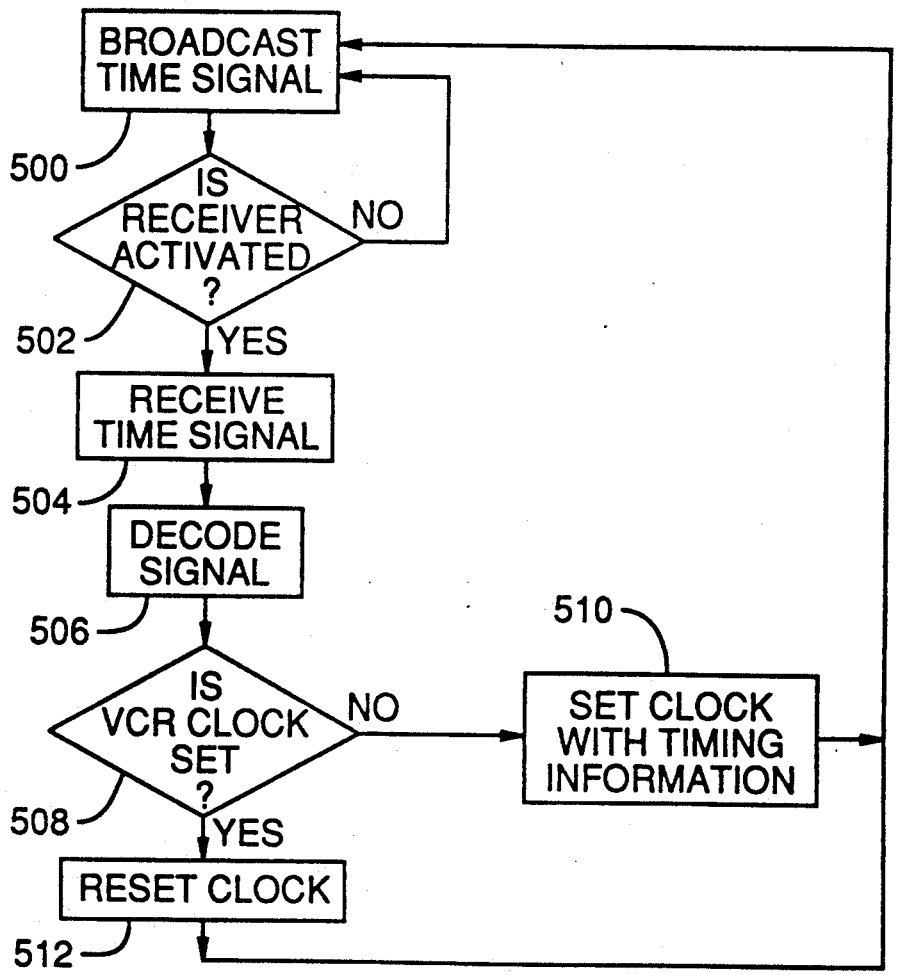

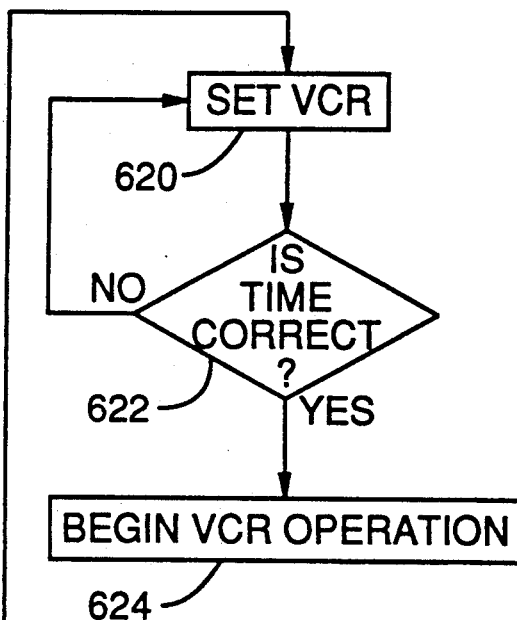
FIG. 6
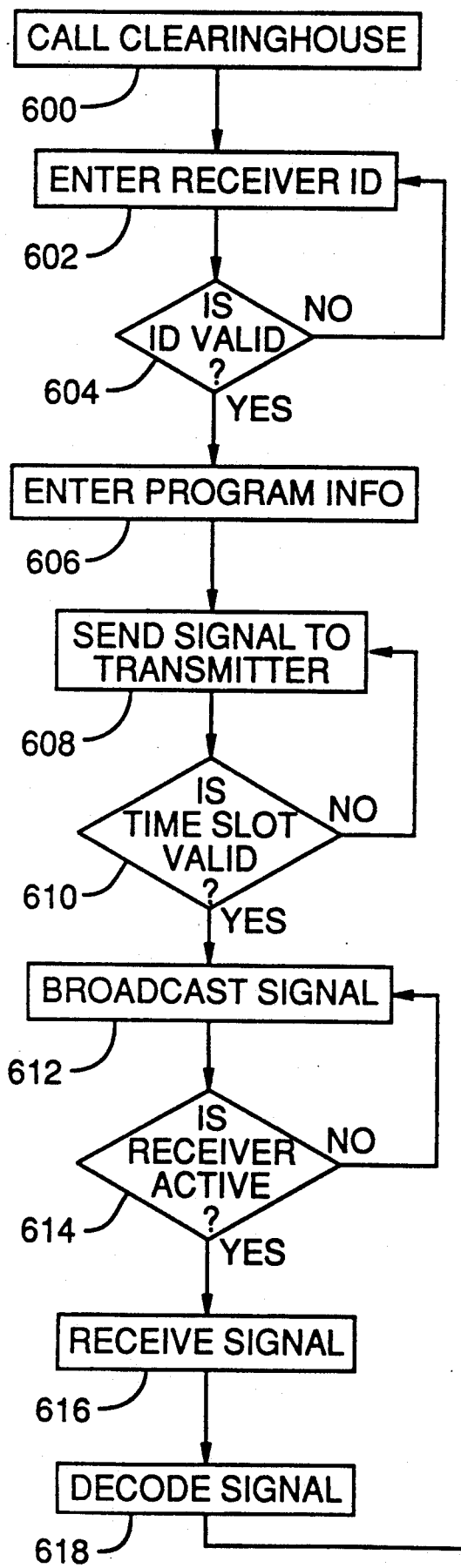

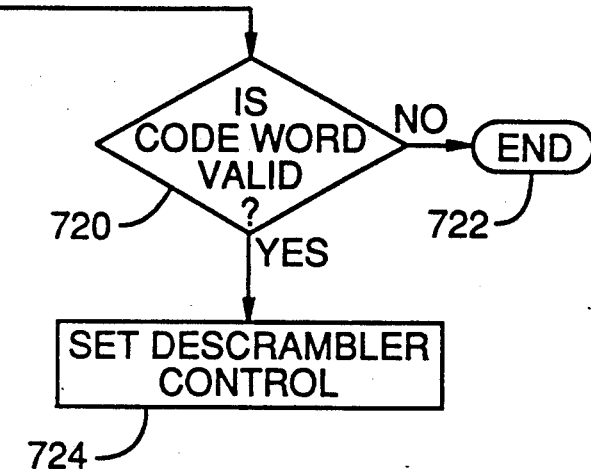
FIG. 7
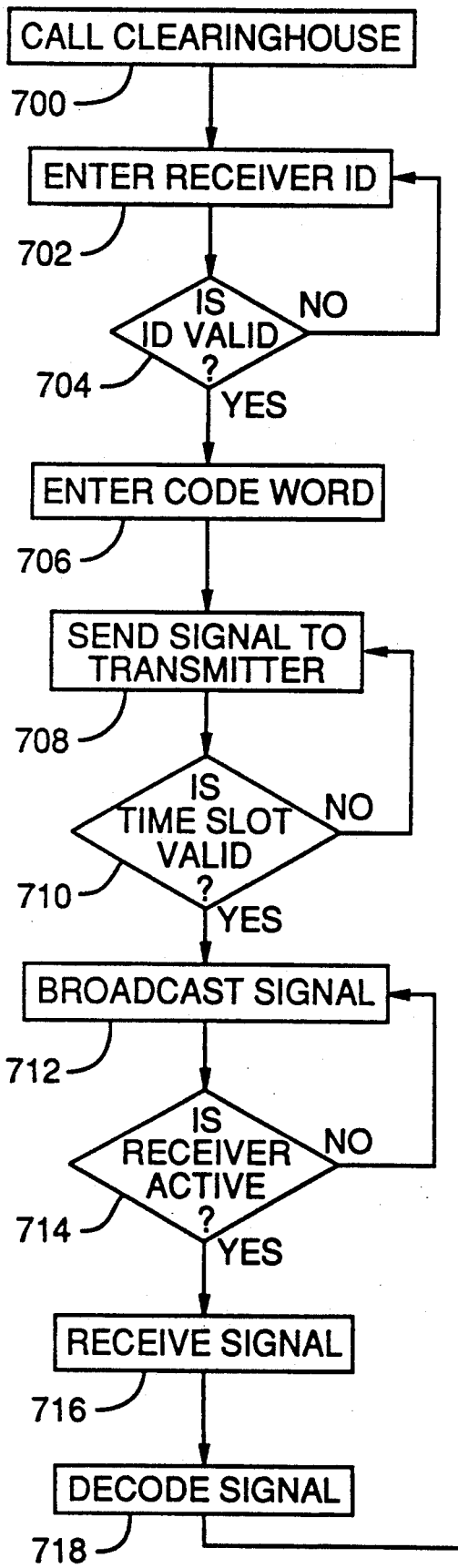

DUAL COMMUNICATION MODE VIDEO TAPE RECORDER

FIELD OF THE INVENTION

The present invention relates to television receivers and video recorders and, more particularly, to apparatus and methods for controlling television receivers and video recorders.

BACKGROUND OF THE INVENTION

For purposes of the present application, the terms "video tape recorders" and "video cassette recorders (VCRs)" are used interchangeably. Moreover, as used herein, the term "broadcast" refers not only to transmission by airwaves, but also to other forms of transmission, such as by cable.

Many presently available VCRs are programmable. That is, such VCRs can be programmed to begin to record TV broadcast material or cable material at a particular time on a particular day by means of a control panel or a remote control device. Moreover, built-in VCR programming functions often allow two or more programs, broadcast on different channels and at different times of the day or week, to be entered into the system. Termination times for respective recording operations are similarly programmable.

VCR programming functions such as those described above are time-dependent. In order to specify the initiation or termination of programming functions, the time of day as well as the day in the week must be specified. Unfortunately, the time clocks in present VCRs can be interrupted and set to the incorrect time by a variety of random factors such as by a short power interruption. Furthermore, the random access memories used to store other information in such systems are generally volatile memories, requiring periodic refreshing to maintain data. Thus, if power levels are degraded or interrupted for even a short period of time, the data that drives the timing circuitry is either corrupted or lost, resulting in inaccurate or indeterminable time values displayed on the VCR clock. These situations can result in recording unintended rather than desired broadcast material.

Over a period of days or weeks, the probability of power fluctuations or interruptions which will cause the system clock to lose synchronization with the correct time increases. Ensuring integrity and maintaining reliability in programmed video tape activities, regardless of power outage situations, is therefore a problem.

A related problem concerns setting and resetting the VCR clock. Resetting operations can be mandated by certain predictable events such as the onset of daylight savings time and time zone changes.

One attempted solution to the foregoing problem has been to supply a backup battery which is used in case normal power is interrupted. This solution is not entirely satisfactory for various reasons. For example, battery replacement is costly, it is difficult to know when a battery has discharged, it is inconvenient to replace a battery, and a battery uses valuable space.

Another attempted solution to the foregoing problem of unreliable power supplies has been to provide a non-volatile memory device for storing use programmed system timing information in the event of a power outage. This solution, however, requires relatively expensive and complex circuitry and generally still requires a battery backup to keep the clock operating without external power.

The present invention also addresses the need to descramble programs transmitted via cable or satellite. Encoding, scrambling or encrypting of specific material, generally transmitted by means of cable, is becoming increasingly more common. Decoding or descrambling operations are generally not automatic. They normally require human intervention at the cable distributor to receive information from one or more subscribers and to take appropriate action to decode the signal.

U.S. Pat. No. 4,771,456 issued to Martin et al discloses one of many descrambling techniques that can be used. In order to make such descrambling operations highly effective, it would be desirable periodically to change code words used to descramble the programs. Furthermore, it would be highly desirable to be able to program specific video tape recorders remotely by using a code word to enable the specific receiver to receive particular, preselected program material. The aforementioned facility would greatly enhance the billing options which could be utilized by cable operators.

Another problem with present video recorders is the difficulty of programming them in a completely flexible manner. Present video cassette recorders must be programmed by use of a relatively lengthy set of commands entered at the VCR control panel or remote control device at the location of, or a short distance from, the VCR. Entering a long set of commands manually is a time consuming, difficult operation which is prone to errors.

In fact, significant problems are encountered by users of presently existing VCRs. From setting the VCR clock to programming a VCR for unattended operation, a considerable degree of skill and care is required. It is necessary to select the station, the day of the week, the time (including a.m. or p.m.), and the length of the program for each program to be recorded. Some VCR owners are unable to master the complexities of setting the VCR for unattended operation, and simply do not use that feature of the equipment. Almost all users, at one time or another, have recorded undesired material through an incorrect setting of the VCR. U.S. Pat. No. 4,706,121 issued to Young discloses a system for recording TV broadcast material from preprogrammed scheduled information; however, the system shown in that reference adds only a limited amount of function to a VCR.

Another limitation of present video recorders is that they do not provide any mechanism for storing messages. Furthermore, people who use paging systems generally must turn from their TV receiver to an entirely separate system to receive messages that are paged to them.

OBJECTS AND ADVANTAGES OF THE PRESENT INVENTION

It would be advantageous to provide a system that would be completely independent of the vicissitudes of the power supply which could keep the VCR clock accurate under all conditions.

It would also be advantageous to provide a system for updating VCR clock settings regardless of time zone or daylight savings time in effect over a significant length of time.

It would also be advantageous to allow a user to perform VCR operations without being in close proximity to the VCR itself.

It would be advantageous to allow a user to program a VCR from a geographically remote location.

It would also be advantageous to provide a system that would allow VCR recordings of material outside of the conventional programmable time period capacity.

It would also be advantageous to provide a system for allowing a carrier to decode certain material for the benefit of a user or a class of users.

It would also be advantageous to provide a system for decoding and descrambling that would be part of, and housed within, a VCR receiver and where the descrambling code could be changed remotely.

It would also be advantageous to provide a system whereby a paging user could visually review all received pages.

It would also be advantageous to provide a system for allowing a plurality of visual and/or audio paging messages to be stored on a VCR tape for later review.

It would also be advantageous to provide a system whereby a paging user could review all paging messages on a television monitor and where the pager and the TV system are integrated.

SUMMARY OF THE INVENTION

In accordance with the present invention, there is provided a dual communication mode system that combines a point to point communications device with a television receiver and a video tape recorder. The result is a highly versatile and easily operated personal entertainment and communication center. The point to point communication device included in the personal communication and entertainment center can provide information to: (a) reset the center time clock automatically if power to the center is interrupted or if the center's clock must be synchronized to an accurate time; (b) program the personal entertainment and communication center from a remote location; (c) provide authorization signals to allow the personal entertainment and communication center to descramble coded signals received by the television receiver from a source such as a satellite or cable hookup; and (d) provide personal messages which can be recorded on the video tape recorder and displayed on the television screen.

BRIEF DESCRIPTION OF THE DRAWINGS

A complete understanding of the present invention may be obtained by reference to the accompanying drawings, when taken in conjunction with the detailed description thereof and in which:

FIG. 2 is a block diagram of the dual communication mode video tape recorder of the present invention;

FIG. 3 is a block diagram of the dual communication mode video tape recorder of the present invention having signal descrambling capability;

FIG. 4 is a block diagram of a channel selector/descrambler for use with one embodiment of the present invention;

FIG. 5 is a flow diagram of system clock setting/resetting operations;

FIG. 6 is a flow diagram of remote programming operations of the system;

FIG. 7 is a flow diagram of descrambling operations; and

DETAILED DESCRIPTION OF THE PREFERRED EMBODIMENT

Figure 1:
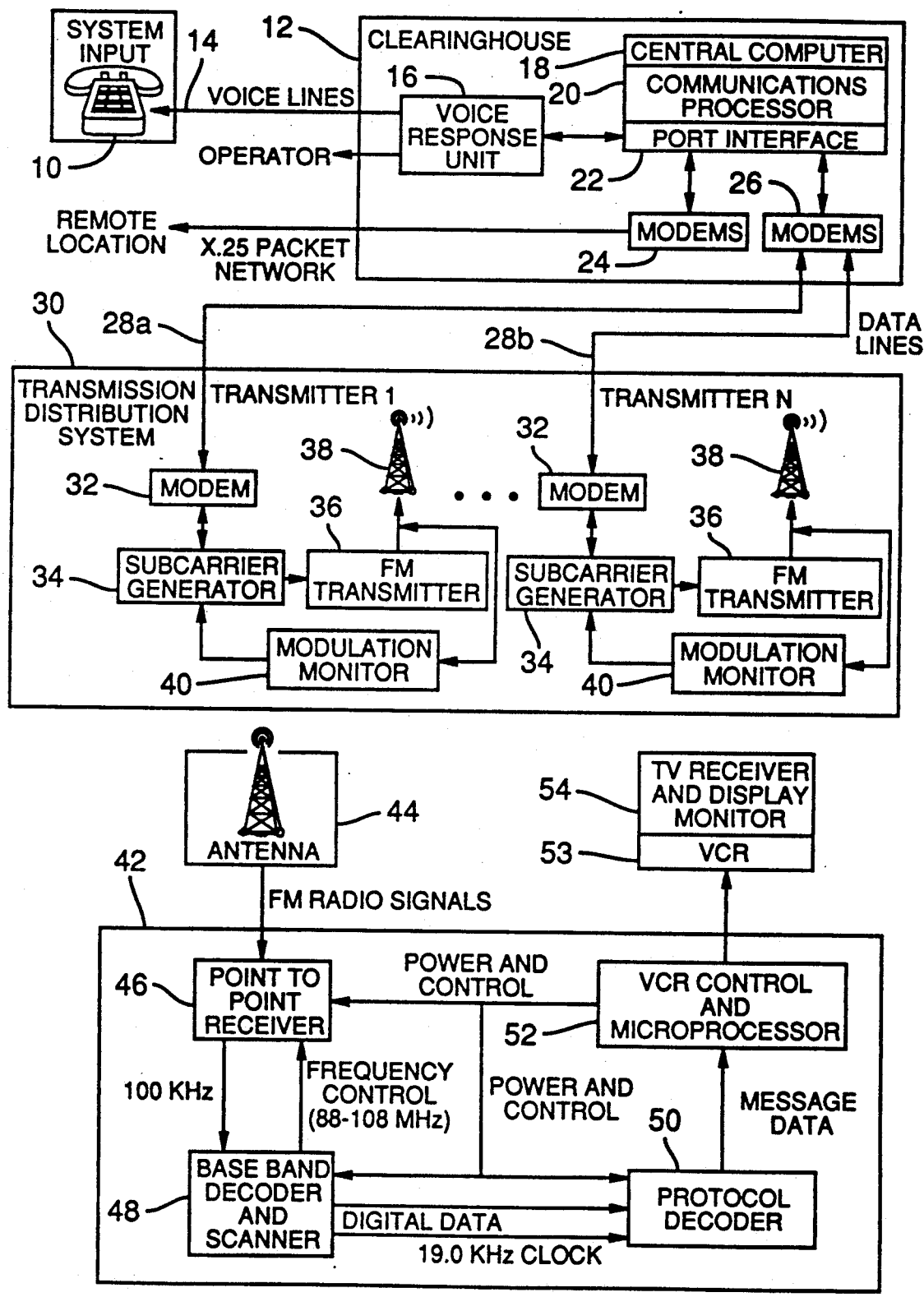
FIG. 1 is a symbolic block diagram of the overall system of the present invention.

Referring now to FIG. 1, there is shown a representational block diagram of a transmission and receiving system that forms the environment of the present invention. A more detailed description of this environment, including a description of signal protocol can be found in U.S. Pat. No. 4,713,808 issued to Gaskill et al, and copending patent application Ser. No. 07/121,139, filed Nov. 16, 1987, both of which are hereby incorporated by reference.

A telephone 10, such as a conventional dual-tone multifrequency (DTMF) keypad instrument commercially available from retail suppliers, can communicate to a clearinghouse 12 over conventional voice phone lines 14. Clearinghouse 12 has an automatic voice response unit for communicating with a calling user. The main components of clearinghouse 12 are a central computer 18 and processor 20, to which is attached an interface 22 that is adapted to communicate both with voice response unit 16 and with modems 24, 26, which facilitate communications, respectively, with clearinghouses, not shown, at remote locations and ultimately with broadcast radio transmission towers.

Modem 26 is adapted to communicate over data lines 28a, 28b to each transmitter and transfers digital information at the rate of 19.2 kilobaud.

Four-wire private line telephone circuits are used as data lines 28a, 28b in the preferred embodiment, but high frequency radio links and microwave links can also be used.

Input data is applied to a distribution system 30 by means of a General Data Comm (GDC) modem 32.

A subcarrier generator 34 is connected to modem 32 and receives a data stream from clearinghouse 12 therefrom. Subcarrier generator 34 modulates data onto a 66.5 kHz amplitude modulation-phase shift keyed (AM-PSK) subcarrier. The subcarrier signal is applied to a radio station transmitter 36 where it is added to the broadcast audio signal. The combined signal is then FM modulated onto the station's main carrier and broadcast by means of an antenna 38.

A modulation monitor 40 is connected to FM transmitter 36 for sampling the FM signal. Modulation monitor 40 provides the combined audio and data signals, which is called base band, to subcarrier generator 34. The data stream is recovered from the FM output signal and is sent to clearinghouse 12 for verification. If a difference exists between the data signal sent by clearinghouse 12 and that sampled by modulation monitor 40, the messages in error are resent by the clearinghouse 12.

A receiver 42, suitably adapted to fit into a VCR housing, not shown, is connected to an antenna 44 for receiving signals that are transmitted by FM transmitter 36 at predetermined times.

An FM receiver 46 comprises a bipolar integrated circuit capable of operating over the 88-108 MHz range, usually allocated for commercial FM broadcasting. FM receiver 46 produces a composite signal that is a range of information from 0 to 100 kHz, which includes audio, a 19 kHz stereo pilot signal, and the subcarrier band above 53 kHz.

Connected to FM receiver 46 is a base band decoder and scanner 48 that extracts data and clock from the audio signal produced by FM receiver 46. The clock is derived from the 19 kHz pilot carrier, which pilot is extracted by means of a phase-locked-loop.

Connected to base band decoder and scanner 48 is a protocol decoder and error correction unit 50, which receives packets transmitted to VCR receiver 42, recognizes flags, stores appropriate information from the data stream, and detects and corrects errors contained in the stored data. The output of unit 50 includes the actual message data transmitted to receiver 42 and time information broadcast periodically by transmitter 38. Unit 50 also contains a packet timer, which measures time between packet receptions, in order to synchronize signal reception with signal transmission in accordance with a predefined protocol, which need not be described in greater detail herein.

Connected to unit 50 is a microprocessor 52 which controls the entire receiver, including controlling power to, and programming of, the other units 46–50. Microprocessor 52 is responsible for interpreting data and displaying it, as required.

Microprocessor 52 enables VCR receiver 42 to store and display multiple messages. Microprocessor 52 also controls the on/off times for the receiver/decoder 46, 48 and controls standard timekeeping and display functions.

Connected to microprocessor 52 is a VCR 53 and a TV broadcast TV use, can also display alphanumeric information such as time and date. Such alphanumeric information also includes, but is not limited to, personal paging messages. One or more messages that have been received over a period of time can be visually displayed and reviewed at the convenience of a paging system subscriber who prefers to view them in this manner.

It is also possible for a TV viewer to have paging messages displayed on the TV screen, not shown, contemporaneously (i.e., as such messages are received) while broadcast TV material is being displayed. In this way, a viewer is not dependent solely on hearing an audible sound from his paging receiver. Visual indications of this sort can convey messages even if the TV sound is set at a relatively high level.

The system can be used to turn on VCR power and start and stop recording of broadcast material on video tape remotely. The user is therefore not required to leave the VCR powered on for unattended recording. In this manner, VCR 53 is adapted for unattended recording of broadcast material. The time of signal transmission and reception is synchronized as described more fully in hereinabove cited U.S. Pat. No. 4,713,808 and patent application Ser. No. 07/121,139, filed Nov. 16, 1987. Accordingly, point to point communication device, which is part of VCR receiver 42 need not be powered for more than a small fraction of time per day, thus conserving electrical power and extending the life of the components.

Referring now also to FIG. 2, there is shown a block diagram of the communication and entertainment center 242 built in accordance with the present invention. It is used in combination with the FM transmitter distribution system 30 (FIG. 1). The center 242 includes a standard TV receiver 202, a point to point communications receiver 203, a video tape recorder 210, a TV display monitor 213 and a system control unit 207.

Communication and entertainment center 242 receives three different types of electronic input signals via antennas 202C, 203C and coaxial cable 202D, respectively. Signals received via antenna 202C and coaxial cable 202D are substantially conventional TV (video) broadcast and cable signals. Point to point signals received via antenna 203C are similar to RF signals received by a conventional paging receiver.

Video and audio signals generated over line 202A by TV receiver 202 are gated either to VCR 210 or to TV display monitor 213 by gate 209 or gate 216 in a conventional manner. Gating video and audio signals of TV receiver 202 to VCR 210 permits recording of such signals onto video tape, not shown, loaded in VCR 210. Gating the signals over line 202A to TV display monitor 213, however, results in the broadcast material being exhibited thereon. Gates 209 and 216 are controlled by system control unit 207, which can be a conventional microprocessor controller that is programmed according to flow diagrams hereinafter described.

Point to point receiver 203 can be a time slot paging receiver of the type shown and described in the aforementioned U.S. Pat. No. 4,713,808 or in copending U.S. patent application Ser. No. 07/121,139, filed Nov. 16, 1987. Point to point receiver 203 receives packets of information that are directed to it specifically. Such messages are received in the form of an FM subcarrier over antenna 203C. The messages are interrogated and decoded by logical circuitry, not shown, or by a microprocessor 204 in a conventional manner. In the above referenced patent and patent application, the system microcontroller performs operations such as activating an audible signal generator or providing signals to drive an LCD display. In the present system, microprocessor 204 decodes messages received and either activates a character generator and video display generator 205 or generates control signals over line 210D. Control signals are sent to system control unit 207 or to the controls of VCR 210. Microprocessor 204 can send a series of commands to controls of VCR 210. This series of commands can correspond to messages received by point to point receiver 203 and can be any series of commands which can be entered manually via the control panel 215 of a VCR. It should be understood that manual control in this context also includes setting by remote control unit, if VCR 210 is so adapted.

Microprocessor 204 can also send a series of signals over line 204A to character generator and video display generator 205. The signals over line 205A from character generator and video display generator 205 can be gated (a) to TV display monitor 213 where they are superimposed on the TV signals, if any, being received by TV receiver 202 or by VCR 210, or (b) to VCR 210 where they are recorded on video tape for future display. The TV signals are superimposed and/or recorded in a conventional composite signal processing manner and need not be shown explicitly herein.

Signals from TV receiver 202, from character generator and video display receiver 205 and from VCR 210 are gated through gates 208, 209, 214, 215 and 216 under control of signals from system control unit 207. The gates and corresponding control signals therefrom are conventional and are shown only symbolically in FIG. 2. Flow diagrams of microcomputer programs in system control unit 207 which generate appropriate control signals are described below with reference to FIGS. 5, 6, 7 and 8.

The system can operate in a number of different modes. First, the system can operate as a conventional TV. Video and audio signals received on antenna 202C or coaxial cable 202D are simply displayed and audibly performed on TV display monitor 213. The broadcast channel being displayed is selected manually by means of TV control circuitry 213A.

Second, messages received on point to point receiver 203 can be displayed alphanumerically on the TV display monitor 213 either alone or superimposed on other TV pictures. In this mode, the messages that appear on the display shown in the above referenced patent and patent application appear on TV display monitor 213 rather than, or in addition to, on the display shown in the referenced patent and patent application.

Third, video and audio signals received on TV receiver 202 can be recorded on a video tape loaded in VCR 210 either under the control of commands manually entered into VCR 210 or under the control of commands entered into VCR 210 via microprocessor 204 in response to messages received by point to point receiver 203.

Fourth, messages received by point to point receiver 203 can be gated to and stored on a video tape loaded in VCR 210 for later playback.

Referring now also to FIG. 3, there is shown an alternate embodiment of the invention, which includes a decrypting, decoding or descrambler circuit 301 connected to TV receiver 302 by means of line 302A. The other components of communication and entertainment center 342 are the same as shown in FIG. 2 with the exception that a line 304C connects microprocessor 304 to descrambler circuit 301.

Descrambler circuit 301, described in greater detail hereinbelow, processes scrambled signals received by TV receiver via coaxial cable 302D or via antenna 302C and decodes them into standard TV signals. Such descramblers are well known and are in general use. Certain TV signals are scrambled prior to broadcast so that only authorized subscribers can receive and decode them. Normally decoding circuitry is factory set and the decoder is provided to viewers who subscribe to a particular service.

It is desirable to enable or disable a descrambler so that a subscriber can purchase only those programs that are of interest. The present invention allows descrambler 301 to be enabled via a message having a code word and received through point to point receiver 303.

Referring now also to FIG. 4, there is shown a block diagram of channel descrambler 301 in greater detail. This descrambler 301 represents one embodiment of the inventive system especially adapted for cable use. Descrambler 301 can be disposed in the VCR housing or in the TV receiver housing, not shown. A signal from a television receiver 302 (FIG. 3) is input over line 302A to descrambler 301. The cable carries a broad band RF signal which typically includes a number of non-scrambled (non-premium) channels and a smaller number of scrambled (premium) channels which the customer pays an additional fee to receive. At least one of the channels on the cable drop is left free and carries no signal. This channel is referred to herein as channel "X". For example, channel "X" may be television channel 17.

The signal input from the cable drop is split by a splitter 411 into two paths, one of which is routed through a channel "X" reject filter 412 to a combiner 430. Reject filter 412 and combiner 430 are conventional circuits formed from passive components, although active filter means can be used for reject filter 412 as will be appreciated by those skilled in the art.

The other path from splitter 411 inputs the cable drop signal into a tuner 416 which can be tuned under remote control to a desired premium channel for descrambling and viewing.

The output of tuner 416 is input to an intermediate frequency (IF) and demodulator stage 418 for standard processing of a tuned signal. The tuned processed signal is then input to decoder 420 for descrambling. Any known method of descrambling the premium channels can be used in connection with the present invention. The descrambled signal is re-modulated at channel "X" modulator 422 to the frequency of channel "X" (e.g., channel 17). The descrambled premium signal then present on channel "X" is combined by combiner 430 with the rest of the broad band cable signal output from channel "X" reject filter 412. Combiner 430 produces a composite cable signal that includes all of the original channels from the cable drop together with the descrambler premium channel on channel "X". The output of combiner 430 is applied over line 301A ultimately to video tape recorder 310 or TV display monitor 313 (FIG. 3).

Channel "X" reject filter 412 is designed to prevent the output of channel "X" modulator 422 from leaking back onto the cable system. It also serves to clean off any residual noise on the cable drop at channel "X", thereby providing a clean channel for insertion of the premium program re-modulated by channel "X" modulator 422.

The tuner and descrambler section of the channel descrambler 301 (i.e., tuner 416, IF and demodulator stage 418, decoder 420) is controlled by control circuitry 424 to step through the channels tunable by tuner 416 one at a time.

A cable system customer may be authorized for one premium channel or more than one. The authorization can be bestowed, withdrawn or changed by a cable system operator by means of an appropriately encoded signal transmission received by point to point receiver 303, compared by microprocessor 304 and entered in control unit 424. Program control will increment the channel tuned by tuner 416 until the desired premium channel is selected. An indication of the premium channel tuned can be displayed on the user's television screen 313. Once the system has selected a premium channel for viewing, the video tape recorder 310 is tuned to channel "X" (e.g., channel 17).

The user interface with channel descrambler 301 can be controlled by programming control section 424 by means of microprocessor 304 to respond to signals received on the user's unique receiving frequency. For example, if channel 17 is used for channel "X", control section 424 would be programmed to "learn" the signal received on the user's receiving frequency when channel 17 is selected. This would be accomplished by placing the control circuitry 424 into a learn mode and transmitting channel 17 on the user's frequency. Control section 424 will then recognize the channel 17 signal from transmitter 38 (FIG. 1) as the "switch" which increments tuner 416 to the next channel. Data indicative of the channel 17 signal emitted from transmitter 38 is stored in memory within control section 424 so the signal can be detected each time it occurs. The user can then step through the premium channels tunable by tuner 41 by repeatedly transmitting channel 17.

As hereinbefore mentioned, a code word is required to enable a user to descramble a specified broadcast channel. The code word must be received by point to point receiver 303 (FIG. 3), transmitted to microprocessor 304 and thence to control unit 424 of descrambler 301.

Flow diagrams shown in FIGS. 5-8, and described in greater detail hereinbelow, are representative of computer programs or microprograms that may be executed by microprocessor 204 (FIG. 2) in cooperation with system control logic 207 or other logic, not shown.

Referring now also to FIG. 5, a flow chart of system automatic clock resetting operation is shown. In operation, a timing information signal is continuously broadcast from clearinghouse 12 (FIG. 1) through FM radio transmitter 38, step 500. Point to point receiver 46 is automatically activated periodically at predetermined times in accordance with predefined protocol. When receiver 46 is active, step 502, the signal is received, step 504. VCR control and the timing information therefrom. If the VCR clock is not set, step 508, the timing signal sets the clock with the accurate time, step 510. If the VCR clock is set, however, step 508, the timing signal resets the clock, step 512. In this way, the VCR clock is set or updated with a new timing signal automatically and periodically at each time slot during which point to point receiver 46 is activated.

Referring now also to FIG. 6, a flow chart of system programming from a remote location is shown. In operation, a user calls clearinghouse 12 (FIG. 1) by using telephone 10, step 600. In the preferred embodiment, a synthesized voice interrogates the user in accordance with a menu script, so that the user is directed to enter certain keys from a telephone keypad at certain times. When prompted to do so, step 602, the user enters the identification number of the point to point receiver 46 that is to receive the programming information. Clearinghouse 12 determines whether the identification number is valid, step 604, and requests another number if the first one does not identify a valid point to point receiver 46.

When prompted to do so, step 606, the user enters program information, such as channel to be recorded, starting date and time, and ending time. An appropriately encoded signal is sent from clearinghouse 12 to transmission distribution system 30, step 608, and thence to FM radio transmitter 38. Depending upon the identification number of point to point receiver 46, clearinghouse 12 determines when a reserved time slot has been reached. If the time slot has not been reached, step 610, broadcast of the appropriate programming signal is delayed. When the time slot has been reached, the programming signal is broadcast, step 612, by radio transmitter 38. If point to point receiver 46 is not activated, step 614, the signal is retransmitted. When receiver 46 is activated, step 614, it receives the signal, step 616, and VCR control and microprocessor 52 decode the signal, step 618.

The information extracted from the signal is sent to VCR 53, step 620, for programming. Once VCR 53 is suitably programmed, a period of time elapses during which VCR 53 is in a wait state, step 622. When the time arrives for VCR 53 to be activated to record the specified broadcast material at the specified time, VCR 53 begins the recording operation, step 624. Thus, it has been shown how a user can use a telephone 10 to program his VCR 53 or control operation thereof from a remote location.

Referring now also to FIG. 7, a flow chart of remote descrambling operations is shown. In operation, a user calls clearinghouse 12 (FIG. 1) by using telephone 10, step 700. In the preferred embodiment, a synthesized voice interrogates the user in accordance with a menu script, so that the user is directed to enter certain keys from a telephone keypad at certain times. When prompted to do so, step 702, the user enters the identification number of the point to point receiver 4 that is to receive the programming information. Clearinghouse 12 determines whether the identification number is valid, step 704, and requests another number if the first one does not identify a valid point to point receiver 46.

When prompted to do so, step 706, the user enters descrambling information, including the channel to be descrambled and a unique code word authorized for such purposes. An appropriately encoded signal is sent from clearinghouse 12 to transmission distribution system 30, step 708, and thence to FM radio transmitter 38. Depending upon the identification number of point to point receiver 46, clearinghouse 12 determines when a reserved time slot has been reached. If the time slot has not been reached, step 710, broadcast of the appropriate programming signal is delayed. When the time slot has been reached, the programming signal is broadcast, step 712, by radio transmitter 38. If point to point receiver 46 is not activated, step 714, the signal is retransmitted. When receiver 46 is activated, step 714, it receives the signal, step 716, and VCR control and microprocessor 52 decode the signal, step 718, extracting the descrambling information as well as the code word.

The information extracted from the signal is compared by microprocessor 52 to determine whether it is valid for the operation requested, step 720. If the code word is not valid, no further action is taken, step 722. If the code word is found to be valid, however, step 720, a signal is sent from microprocessor 304 (FIG. 4) to control unit 424 of descrambler 301 so as to allow the specified channel to be descrambled. Thus, it has been shown how a user or a cable system operator can use a telephone 10 to instruct VCR point to point receiver 46 to descramble TV broadcast signals for a cable service subscriber, as long as the user or operator accesses the subscriber equipment by individual, unique frequency.

Figure 8:
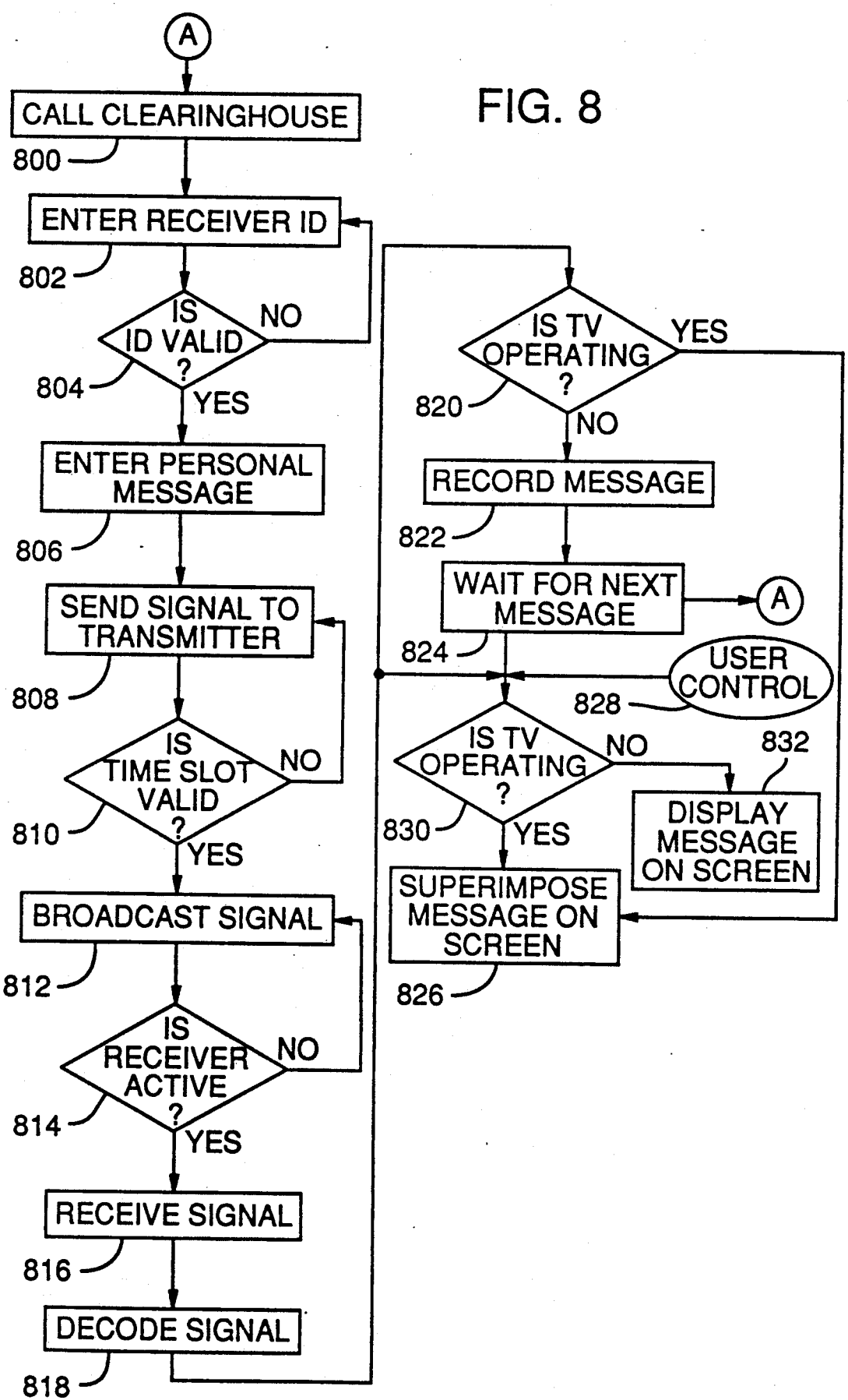
FIG. 8 is a flow diagram of transmission, recording and TV screen displaying operations of point to point personal communication messages in accordance with the present invention.

Referring now also to FIG. 8, a flow chart is shown describing the storing and displaying of personal message from remote locations. In operation, a user calls clearinghouse 12 (FIG. 1) by using telephone 10, step 800. In the preferred embodiment, a synthesized voice interrogates the user in accordance with a menu script, so that the user is directed to enter certain keys from a telephone keypad at certain times. When prompted to do so, step 802, the user enters the identification number of the point to point receiver 46 that is to receive the programming information. Clearinghouse 12 determines whether the identification number is valid, step 804, and requests another number if the first one does not identify a valid point to point receiver 46.

When prompted to do so, step 806, the user enters a message, such as a personal paging message intended for a specified individual. An appropriately encoded signal is sent from clearinghouse 12 to transmission distribution system 30, step 808, and thence to FM radio transmitter 38. Depending upon the identification number of point to point receiver 46, clearinghouse 12 determines when a reserved time slot has been reached. If the time slot has not been reached, step 810, broadcast of the appropriate programming signal is delayed. When the time slot has been reached, the programming signal is broadcast, step 812, by radio transmitter 38. If point to point receiver 46 is not activated, step 814, the signal is retransmitted. When receiver 46 is activated, step 814, it receives the signal, step 816, and VCR control and microprocessor 52 decode the signal, step 818, extracting the personal message.

Once decoding has been performed, microprocessor 204 (FIG. 2) sends an appropriate signal to system control 207, which determines whether TV display monitor 213 is operating, step 820. At the same time, microprocessor 204 sends the message signal to character generator and video display generator 205 for suitable visual formatting of the message. If monitor 213 is not ON, the control signal from system control 207 is routed through gate 208 and the personal message from character generator and video display generator 205 is recorded on video tape, not shown, loaded in VCR 210, step 822. The system then waits for the next personal message to arrive by means of point to point receiver 46, step 824.

If TV display monitor 213 is ON, step 820, the control signal from system control 207 is routed through gate 216 and the personal message from character generator and video display generator 205 is superimposed by means of a composite video signal onto the existing image displayed on TV display monitor 213, step 826.

When the VCR user accesses the entertainment and communication center 242, step 828, he may turn his TV display monitor 213 ON. If monitor 213 is turned ON, step 830, and one or more messages have been recorded on video tape, the control signal from system control 207 is routed over line 210C to direct VCR 210 to send the recorded message(s) by means of gate 214 to control circuitry 213A of TV display monitor 213. The personal message(s) from character generator and video display generator 205 is superimposed by means of a composite video signal onto the existing image displayed on TV display monitor 213, step 826.

It is also possible that a TV viewer will be viewing broadcast material on TV display monitor 213 when a message is received by point to point receiver 42. When this occurs, the control signal from system control 207 is routed over line 207A to gate 216 to control circuitry 213A of TV display monitor 213. The personal message from character generator and video display generator 205 is superimposed by means of a composite video signal onto the existing image displayed on TV display monitor 213, step 826.

If monitor 213 is turned OFF, however, step 830, but the entertainment and communication center 242 is otherwise powered up and one or more messages have been recorded on video tape, the control signal from system control 207 is again routed over line 210C to direct VCR 210 to send the recorded message(s) by means of gate 214 to control circuitry 213A of TV display monitor 213. The personal message(s) from character generator and video display generator 205 is simply displayed on TV display monitor 213, step 832.

Thus, it has been shown how one or more messages can be sent by means of a telephone 10 to instruct VCR point to point receiver 46 to record the personal messages onto video tape for later playback and review.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A system for visually displaying paging messages comprising:
   (a) a television monitor;
   (b) a VCR operatively connected to said television monitor;
   (c) means operatively connected to said VCR for generating alphanumeric characters for display on said television monitor; and
   (d) means operatively connected to said character generating means for receiving RF signals on a predetermined frequency having information representative of a paging message embedded therein, said RF signals being initiated telephonically by a user at a remote location.

2. The system for visually displaying paging messages in accordance with claim 1 wherein said RF signals comprise information representative of a plurality of paging messages received over a period of time, each of said plurality of paging messages being displayed in alphanumeric form on said television monitor.

3. A communication and entertainment center comprising in combination:
   (a) a television receiver and a television display device;
   (b) a video tape recorder including recording controls and a clock;
   (c) a point to point communication device for receiving messages;
   (d) decoder means for decoding the messages received by said point to point communication device and for generating control signals and video images therefrom; and
   (e) means for resetting :nd activating said recording controls in response to said control signals;
whereby said clock can be set by the messages received on said point to point communication device.

4. A system for automatically resetting a video tape recorder timer comprising:
   (a) a video tape recorder having a timer; and
   (b) means operatively connected to said video tape recorder means for receiving RF signals on a predetermined frequency having information representative of time embedded therein, said RF signals being initiated periodically by a paging system, and wherein said RF signal receiving means is adapted to pass said embedded time information to said video tape recorder timer.

5. The system for automatically resetting a video tape recorder timer in accordance with claim 4 wherein said video tape recorder comprises means for uniquely identifying the operator thereof.

6. A video system comprising:
   (a) a video tape recorder;
   (b) means operatively connected to said video tape recorder for controlling operations thereof;
   (c) means operatively connected to said controlling means for receiving RF signals on a predetermined frequency having information embedded therein, said RF signals being initiated telephonically by a user at a remote location, and wherein said RF signal receiving means is adapted to pass said embedded information to said controlling means;
   (d) wherein said RF signals are frequency modulated (FM);
   (e) wherein said signal receiving means comprises decoding means for extracting said information from said FM signals; and (f) wherein said information comprises data representative of time for resetting said controlling means clock.

7. A video system comprising:
(a) a video tape recorder;
means operatively connected to said video tape recorder for controlling operations thereof;
(c) means operatively connected to said controlling means for receiving RF signals on a predetermined frequency having information representative of paging messages embedded therein, said RF signals being initiated telephonically by a user at a remote location, and wherein said RF signal receiving means is adapted to pass said embedded information to said controlling means; and
(d) wherein a plurality of paging messages is recorded by said video tape recorder for subsequent review.

8. The video system in accordance with claim 7, further comprising a TV monitor adapted to selectively display said messages.

9. A VCR capable of operating pursuant to instructions generated at a remote location comprising:
(a) means for receiving signals indicative of TV material; and
(b) means for receiving user-initiated VCR operating instructions embedded in and broadcast on a predetermined low frequency paging carrier, whereby VCR recording of said TV material is controlled by said user initiated instructions.

10. The VCR in accordance with claim 9 wherein said VCR comprises timing means.

11. The VCR in accordance with claim 10 wherein said VCR operating instructions comprise timing signals for resetting said timing means.

12. The VCR in accordance with claim 11 wherein said means for receiving user-initiated VCR operating instructions comprises means for recording paging information for subsequent playback.

13. The VCR in accordance with claim 12 wherein said means for receiving user-initiated VCR operating instructions is adapted to transfer a paging message to a TV monitor.

* * * * *